US010128716B2

United States Patent
Teimel et al.

(10) Patent No.: US 10,128,716 B2
(45) Date of Patent: Nov. 13, 2018

(54) ELECTRIC DIRECT CURRENT MOTOR WITH FLEXIBLE ROTOR ASSEMBLY AND METHOD FOR THE MANUFACTURE THEREOF

(71) Applicant: Maxon Motor AG, Sachseln (CH)

(72) Inventors: Arnold Teimel, Giswil (CH); Yves Triponez, Sins (CH); Peter Mitterback, Hergiswil (CH)

(73) Assignee: LAKEVIEW INNOVATION LTD., Buochs (CH)

( * ) Notice: Subject to any disclaimer, the term of this patent is extended or adjusted under 35 U.S.C. 154(b) by 234 days.

(21) Appl. No.: 14/993,909

(22) Filed: Jan. 12, 2016

(65) Prior Publication Data

US 2016/0126796 A1    May 5, 2016

Related U.S. Application Data

(62) Division of application No. 13/880,626, filed as application No. PCT/EP2011/004784 on Sep. 23, 2011, now Pat. No. 9,564,783.

(30) Foreign Application Priority Data

Oct. 25, 2010  (DE) ......................... 10 2010 049 524

(51) Int. Cl.
*H02K 3/46* (2006.01)
*H02K 1/30* (2006.01)
(Continued)

(52) U.S. Cl.
CPC ................ *H02K 3/46* (2013.01); *H02K 1/30* (2013.01); *H02K 3/28* (2013.01); *H02K 11/028* (2013.01);
(Continued)

(58) Field of Classification Search
CPC .. H02K 3/46; H02K 3/28; H02K 3/47; H02K 1/30; H02K 13/00; H02K 13/04;
(Continued)

(56) References Cited

U.S. PATENT DOCUMENTS 4,088,914 A * 5/1978 Aoki ..................... H02K 1/26
310/237
4,110,901 A   9/1978 Nakamura et al.
(Continued)

FOREIGN PATENT DOCUMENTS

DE   19 11 093 U    3/1965
DE   2 30 118 A1    11/1985
(Continued)

OTHER PUBLICATIONS

Machine translation of DE 102004026540 A1 (Dec. 2005).*
(Continued)

*Primary Examiner* — Michael Andrews
(74) *Attorney, Agent, or Firm* — Buchanan Ingersoll & Rooney PC

(57) ABSTRACT

An electric direct current motor is disclosed which includes a shaft, a winding support, a collector having several collector wires, and an air-cored outer rotor winding with several winding terminations. The outer rotor winding is at one end connected to the shaft via the winding support in a torque-proof manner, and is electrically connected with the collector. The winding support can be replaced by a printed circuit board as a bearing component of glass-fiber reinforced thermosetting plastics, wherein the printed circuit board includes at least one layer and is connected to the shaft via a metal hub.

9 Claims, 7 Drawing Sheets

Figure 1A:
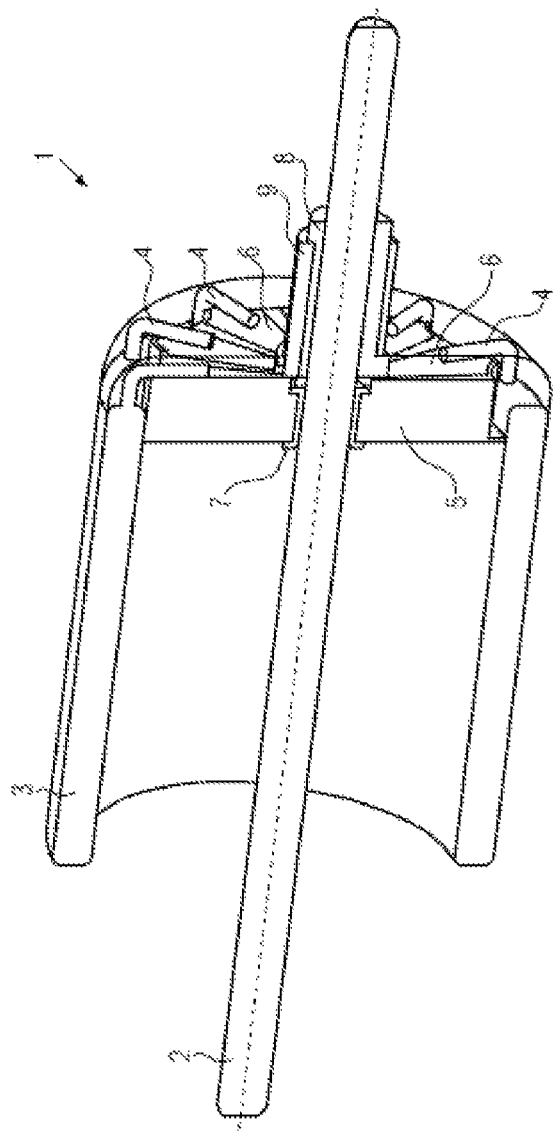

(51) Int. Cl.
*H02K 13/04* (2006.01)
*H02K 13/10* (2006.01)
*H02K 23/56* (2006.01)
*H02K 3/28* (2006.01)
*H02K 11/028* (2016.01)
*H02K 15/02* (2006.01)
*H02K 13/00* (2006.01)

(52) U.S. Cl.
CPC ............ *H02K 13/00* (2013.01); *H02K 13/04* (2013.01); *H02K 13/105* (2013.01); *H02K 15/02* (2013.01); *H02K 23/56* (2013.01); *H02K 13/006* (2013.01); *H02K 2211/03* (2013.01)

(58) Field of Classification Search
CPC .. H02K 13/105; H02K 13/006; H02K 11/028; H02K 23/56; H02K 2211/03
USPC .......................................................... 310/235
See application file for complete search history.

(56) References Cited

U.S. PATENT DOCUMENTS

| | | | |
|---|---|---|---|
| 4,286,375 A * | 9/1981 | Nakamura | ............... H02K 3/00 310/234 |
| 4,323,805 A | 4/1982 | Caby et al. | |
| 4,533,848 A | 8/1985 | Nakamura | |
| 5,373,209 A | 12/1994 | Strobl et al. | |
| 5,679,996 A * | 10/1997 | Strobl | .................... H01R 39/04 310/234 |
| 6,144,133 A | 11/2000 | Steffan et al. | |
| 2005/0057109 A1 * | 3/2005 | Tenca | ..................... H02K 11/21 310/68 B |
| 2007/0007845 A1 | 1/2007 | Suzuki et al. | |
| 2007/0262673 A1 | 11/2007 | Bertolini et al. | |
| 2010/0319976 A1 * | 12/2010 | Nakai | ................... H02K 11/33 174/261 |

FOREIGN PATENT DOCUMENTS

| | | | |
|---|---|---|---|
| DE | 197 40 551 A1 | 3/1999 | |
| DE | 100 21 392 C2 | 9/2002 | |
| DE | 102 50 142 A1 | 5/2004 | |
| DE | 10 2004 026 540 A1 | 12/2005 | |
| DE | 10 2004 026540 A1 | 12/2005 | |
| DE | 102004026540 A1 * | 12/2005 | .......... H01R 39/045 |
| EP | 1 855 372 A1 | 11/2007 | |
| JP | 52-094114 U | 7/1977 | |
| JP | 54-078811 U | 6/1979 | |
| JP | 55-41138 A | 3/1982 | |
| JP | 62-60456 A | 3/1987 | |
| JP | 64-008852 A | 1/1989 | |
| JP | 06-089769 A | 3/1994 | |
| JP | 06-031368 U | 4/1994 | |
| JP | 1 1-21 5785 A | 8/1999 | |
| JP | 2002-058214 A | 2/2002 | |

OTHER PUBLICATIONS

Chinese Office Action issued in corresponding Chinese patent application No. 201180051331.2 dated Jun. 2, 2016, with English translation.
International Search Report (PCT/ISA/210) dated Mar. 22, 2013, by the European Patent Office as the International Searching Authority for International Application No. PCT/EP2011/004784.
German Search Report for DE 102010049524.7 dated Oct. 20, 2011.
K. Orthmann, "Kleben in der Elektronik", Expert Verlag, Renningen_Malmsheim, XP002670310, 1995, pp. 13-14.
Office Action (Notice of Reasons for Rejection) dated Jul. 1, 2014, by the Japan Patent Office in corresponding Japanese Patent Application No. 2013-535289, and an English language translation of the Office Action. (8 pages).
Office Action (Notice to Submit Response) dated Jul. 11, 2014, by the Korean Intellectual Property Office in corresponding Korean Patent Application No. 10-2013-7013026, and English language translation of the Office Action. (16 pages).
Office Action (Notice of the First Office Action) dated Apr. 3, 2015, by the State Intellectual Property Office of the People's Republic of China in corresponding Chinese Patent Application No. 201180051331.2, and an English language translation of the Office Action. (35 pages).

* cited by examiner

ELECTRIC DIRECT CURRENT MOTOR WITH FLEXIBLE ROTOR ASSEMBLY AND METHOD FOR THE MANUFACTURE THEREOF

The present disclosure is related to an electric direct current motor and method for the manufacture of an electric direct current motor.

From prior art, small electric direct current motors with an air-cored outer rotor are known. The rotor of such an electric direct current motor essentially comprises a shaft, an air-cored, hollow-cylindrical outer rotor winding with several winding terminations, and a collector with several collector wires which are disposed around the cylindrical collector like lamellae and are electrically connected to the winding terminations of the outer rotor winding. The outer rotor winding is typically fixed to the outer periphery of a so-called winding support on one side and held by the latter coaxially to the shaft in a torque-proof manner.

Such an electric direct current motor is known, for example, from DE 10021392 C2. The winding support of the electric motor described therein is injected onto the shaft together with the collector when it is being manufactured from plastics. To positively secure the plastic component composed of the winding support and the collector axially and in the circumferential direction, the shaft has a knurled area and an annular groove in the region of the injected coat. The collector wires disposed on the collector sleeve like lamellae are radially bent outwards in the region of the winding support, extend radially on the outer side of the winding support, and are each welded to one of the winding terminations. One chip capacitor is soldered onto each collector wire through axial passages, the chip capacitors being radially interconnected by a short circuit ring of copper and thus representing an interference suppression circuit for suppressing sparks and extending the service life of the electric motor. It is also known to place the interference suppression circuit in form of a so-called capacitor disc onto the winding support from the rear or front. Such capacitor discs are in most cases made of special ceramics or a printed circuit board and comprise suited contact surfaces for contacting one collector wire each. The capacitor discs each comprise a capacitance and a resistance which are connected serially or in parallel each between two adjacent contact surfaces and thus between two adjacent collector wires. The use of capacitor discs is known, for example, from DE 19740551 A1.

In the manufacture of the described electric direct current motors, various customer demands must be taken into consideration. For example, depending on the application, different shafts are required, and/or different collector wires are used for noble metal or graphite brush commutation. Since both the shaft and the collector wires in the rotors known from prior art are coated by extrusion-coating the winding support and the collector in one processing step with plastics and are therefore finally positioned with respect to each other, the desired rotor variant must be already known at a very early point in time of manufacture. The known rotor assembly therefore involves low flexibility and long processing times during manufacture. A further disadvantage of the known rotor assembly resides in the fact that the winding support of the injected plastic must be relatively thick for the required stability and for securely transmitting the motor driving torque, whereby the structural volume and in particular the structural length of the rotor and thus of the complete electric motor are relatively large. The required structural volume is getting the larger the more attachments, for example capacitor discs for spark suppression, are placed onto the winding support.

It is therefore the object of the present invention to provide a rotor assembly that permits higher flexibility in the manufacture and ensures a smaller structural volume of the rotor. It is also the object of the present invention to provide a method for the manufacture of an electric direct current motor which permits higher flexibility in the rotor manufacture compared to the manufacturing processes known from prior art.

Here, one assumes an electric direct current motor, in particular of small dimensions, that comprises a shaft, a winding support, a printed circuit board, a collector having several collector wires, and an air-cored outer rotor winding with several winding terminations. The outer rotor winding is at one end connected to the shaft via the winding support in a torque-proof manner, and it is moreover electrically connected with the collector. The winding support represents a bearing component. According to the present invention, the winding support is replaced by the printed circuit board as a bearing component of a glass-fiber reinforced thermosetting plastic, the printed circuit board being designed with at least one layer and connected to the shaft via a metal hub. The glass-fiber reinforced thermosetting plastics employed for the printed circuit board have a modulus of elasticity that can be up to twice as high as the modulus of elasticity of good glass-fiber reinforced thermoplastics which are employed in prior art for extrusion-coating the winding support with plastic. The printed circuit board can therefore have an essentially thinner design as a bearing component than the winding support known from prior art. The metal hub in the center of the printed circuit board permits to place the printed circuit board onto the shaft at any time during rotor assembly. Here, one can choose among a plurality of different shafts and different printed circuit boards when printed circuit boards are manufactured with uniform hub diameters and the different shafts also have a uniform diameter at least in the region where they are later connected to the printed circuit board. This permits a very flexible rotor assembly for realizing most diverse customer demands. A steel hub is preferably suited as the metal hub, and the shaft is also preferably made of steel.

An exemplary method for the manufacture of such an electric direct current motor comprises the following subsequent procedure steps according to the invention:

For mounting the rotor, the printed circuit board is first pressed onto the shaft with the metal hub; then, the metal hub and the shaft are welded to one another. Depending on the customer's demand, one can choose among a plurality of different printed circuit boards and shafts. In a next step, the collector is placed onto the shaft with the collector wires as a separate unit, the collector wires being electrically connected with a pertaining winding termination via suited contact surfaces after the outer rotor winding has been placed. Since the collector represents an independent unit, here, too, different designs can be employed, e. g. for noble metal or graphite brush commutation. Collector wires and winding terminations can be soldered either directly or on a mutual copper surface of the printed circuit board. Subsequently, the electric and mechanical connection points are cast with a casting compound. This increases stability on the one hand, and on the other hand, the casting compound serves as a protection for the electrical connections from short circuits, which are caused, for example, by pulverized coal arising from the abrasion of the graphite brushes which could otherwise deposit on and between the collector wires or winding terminations.

The object is alternatively achieved by the features of the exemplary embodiments of the present invention described herein. Here, one assumes an electric direct current motor, in particular of small dimensions, that comprises a shaft, a winding support, a collector having several collector wires, and an air-cored outer rotor winding with several winding terminations. The outer rotor winding is connected to the shaft at one end via the winding support in a torque-proof manner, and it is moreover electrically connected with the collector directly or through a printed circuit board. The electric and mechanical connecting points can be cast with a casting compound, for example a resin. The winding support represents a bearing component. According to the invention, the winding support is a metallic plate having a central bore for the connection with the shaft. Furthermore, an insulation ring of plastics or ceramics is provided at the outer periphery of the metallic plate according to the invention for electric insulation against the outer rotor winding. The insulating plastic can be applied by partial extrusion coating. By the connection of the metallic plate with the shaft being achieved through a bore, the two components can be assembled from a plurality of different shafts and different metallic plates to form a unit. This means high flexibility for the rotor assembly, where individual customer demands can be taken into consideration. Here, it is conceivable that the bore is produced in the metallic plate only just before assembly corresponding to the diameter of the desired shaft. As an alternative, a uniform diameter of the bore can be determined, where the different shafts have the diameter of the bore, at least in the region of the connection with the metallic plate. In particular if steel is employed for the metallic plate, the latter can have an extremely thin design compared to the plastic winding supports known from prior art thanks to its material properties that are superior to plastics, in particular high strength, while stability is equal or even better. Thereby, a small structural volume and in particular a small structural length of the rotor are achieved. By the insulation ring of plastics or ceramics at the outer periphery of the metallic plate, short circuits of the outer rotor winding are prevented. The metallic plate can be manufactured as a turned part, by punching, metal-powder injection molding or sintering.

The method for manufacturing such an electric direct current motor comprises the following successive procedure steps according to the invention:

For assembling the rotor, the metallic plate is first pressed onto the shaft; then, the metallic plate and the shaft are welded to one another. Depending on the customer's demand, one can choose among a plurality of different shafts and metallic plates as winding support. In one of the following steps, the collector with the collector wires is placed onto the shaft as a separate unit. Here, too, different variants are possible depending on the customer's demand, for example for noble metal or graphite brush commutation. The collector wires are electrically connected with a corresponding winding termination via respectively suited contact surfaces after the outer rotor winding has been placed. This can be done by soldering or welding. Subsequently, the electrical and mechanical connection points are cast with a casting compound. This on the one hand increases stability, and on the other hand, the casting compound serves as a protection for the electrical connections from short circuits which are caused, for example, by pulverized coal which arises from the abrasion of the graphite brushes and could otherwise deposit on and between the collector wires or winding terminations.

Further embodiments of the present invention are the subject matter of the subclaims.

The following statements refer to advantageous embodiments of the exemplary electric direct current motor described herein.

In a preferred embodiment, the printed circuit board comprises, on its axial outer side opposed to the outer rotor winding, several separate copper surfaces distributed in the circumferential direction for contacting each one winding termination and one corresponding collector wire. This facilitates the assembly of the rotor considerably. After the collector has been placed onto the shaft which is already connected to the printed circuit board, first the collector wires can be soldered to one of the copper surfaces each. Soldering takes place in a radially internal area of the copper surfaces. After the outer rotor winding has been placed, the winding terminations can be soldered onto a radially external area of one copper surface each.

Advantageously, an interference suppression circuit is integrated in the printed circuit board for reducing sparking during commutation. This permits a compact design, even if an interference suppression circuit is used, where additional working steps for the installation of the interference suppression circuit during the assembly of the rotor are eliminated. Such interference suppression circuits considerably extend the service life of a motor with noble metal brushings and simultaneously reduce electromagnetic radiation during the operation of the motor.

In a particularly preferred embodiment, the printed circuit board is assembled with several layers in the axial direction. This permits to integrate circuits applied on inner layers of the printed circuit board, in the printed circuit board where they are protected by the outer layers of the printed circuit board. It turned out to be particularly advantageous for the electric components of the interference suppression circuit to be integrated on an internal layer of the multilayer printed circuit board by means of the so-called "embedded" technology, and to be thus protected by the outer layers of the printed circuit board e. g. from loads by handling during assembly. Since the circular surface available on the winding support in the axial direction offers only very little space for assembling the components on the outer surface due to the contacting of the winding terminations and possibly additional electrical connections to the collector, only the described "embedded technology" permitted to integrate an interference suppression circuit even in small motors with a diameter of less than 13 mm. By the arrangement of the components in the inner layers of the printed circuit board, larger housing shapes which permit more power dissipation can be additionally employed and thus extend their service lives. By the better thermal conductivity of the board material compared to air, the arising lost heat is moreover better dissipated. It is also advantageous in multilayer printed circuit boards for the metal hub of the printed circuit board to be positively embedded in the multilayer printed circuit board with at least one radial groove and/or radial tongue. Here, positive connection elements, for example teeth, can also be formed in the circumferential direction of the metal hub which secure the printed circuit board and its metal hub, besides the axial positive fit by the radial groove or radial tongue, also against rotation with respect to each other.

In a further advantageous embodiment, the metal hub can be embedded in one or several layers of the printed circuit board in the manufacturing process of the printed circuit board.

It is simple and inexpensive as to manufacture to press the metal hub into the printed circuit board and border or radially rivet it with the latter.

In another preferred embodiment, the metal hub is connected with the shaft by frictional and material bonding connections. Thereby, maximum stability and an optimal transmission of the motor torque are ensured. The frictional connection can be accomplished, for example, by pressing the metal hub onto the shaft, while the material bonding connection is accomplished by welding. Particularly precise non-warping welding was achieved by laser welding. Laser welding is moreover inexpensive and permits a quick manufacturing process.

The following statements refer to advantageous aspects of the inventive electric direct current motor described herein.

Accordingly, it turned out to be particularly advantageous to connect the metallic plate to the shaft by frictional and material bonding connections. This ensures high stability and a secure transmission of the torque within the rotor. The frictional connection can be accomplished, for example, by pressing the metal hub onto the shaft, while the material bonding connection is accomplished by welding. Advantageously, a laser welding process is employed which is inexpensive on the one hand and ensures an extremely quick assembly of the rotor on the other.

In a preferred embodiment, the metallic plate has, at least on its axial outer side opposed to the outer rotor winding, an electrically insulating coating or an electrically insulating coat. This prevents short circuits that might be caused by collector wires or winding terminations extending on the outer side of the metallic plate.

Advantageously, a printed circuit board with an interference suppression circuit for reducing sparking during commutation is placed on the axial outer side of the metallic plate. Such interference suppression circuits considerably extend the service life of a motor with brush commutation and simultaneously reduce electromagnetic radiation during the operation of the motor. Advantageously, the printed circuit board has several separate electric contact surfaces distributed in the circumferential direction for contacting each one winding termination and one corresponding collector wire. Thereby, the assembly and in particular the electric contacting of collector wires and winding terminations are considerably facilitated.

In a particularly preferred embodiment, the printed circuit board is assembled with several layers in the axial direction. This permits to integrate circuits applied on inner layers of the printed circuit board in the printed circuit board protected by the outer layers of the printed circuit board. It turned out to be particularly advantageous for the electric components of the interference suppression circuit to be integrated on an inner layer of the multilayer printed circuit board by means of the so-called "embedded" technology and thus to be protected by the outer layers of the printed circuit board. This permits to integrate an interference suppression circuit even in small motors having diameters of less than 13 mm. By the arrangement of the components in the inner layers of the printed circuit board, larger housing shapes which permit higher power dissipation can be additionally employed and thus extend their service lives. By the better thermal conductivity of the board material compared to air, the arising lost heat is moreover better dissipated. In contrast to the employment of capacitor discs, whose capacitance is determined by the area and the layer structure, in a populated printed circuit board, the wiring and dimensioning of the components, e. g. of resistors and capacitors, can be optimally adjusted to the winding and the motor.

In another preferred embodiment of the present invention, a contact star punched out of sheet copper is placed onto the axial outer side of the metallic plate opposed to the outer rotor winding. The beams of this contact star are advantageously spaced apart by at least one injected plastic ring. Each beam of the contact star serves the contacting of a winding termination and the respective pertaining collector wire. This embodiment facilitates assembly and is in particular suited for high current intensities. Advantageously, the beams of the contact star are interconnected by an interference suppression circuit for reducing sparking during commutation. Here, a good automation of manufacture is achieved if the interference suppression circuit is accommodated on a printed circuit board. The basic material of the printed circuit board on which the interference suppression circuit and the electric components are applied is preferably a glass-fiber reinforced thermosetting plastic, such as FR4. As an alternative, ceramics is also suited as basic material.

In another preferred embodiment, the metallic plate is coated with plastics for avoiding short circuits and for electric shielding.

Figure 1B:
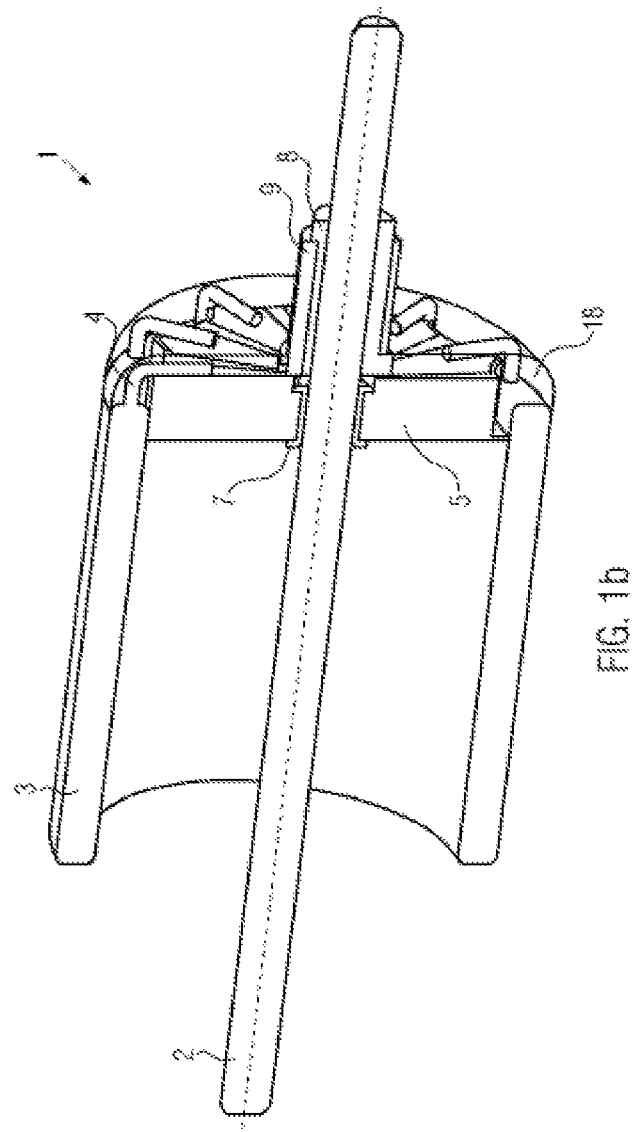
Figure 2:
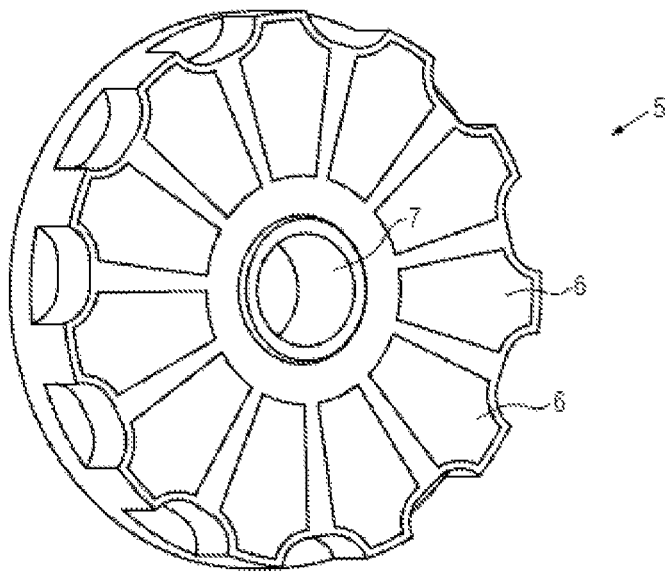
Figure 3:
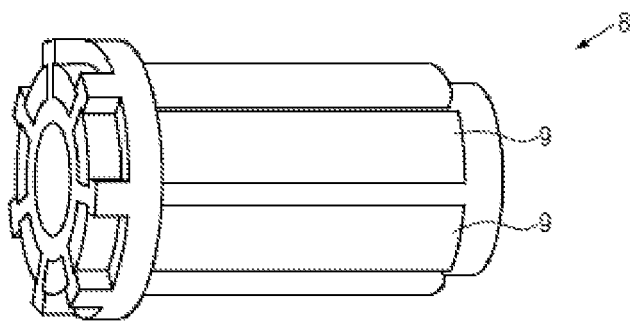
Figure 4:
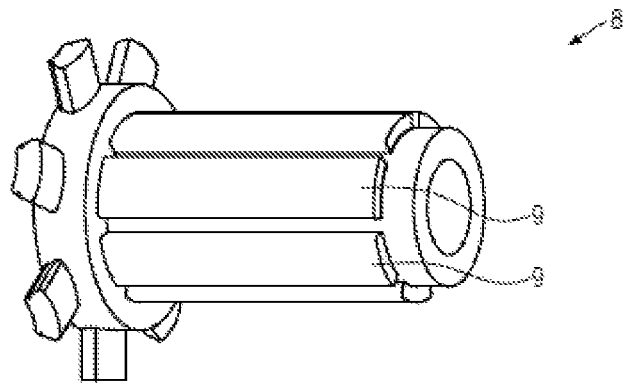
Figure 5:
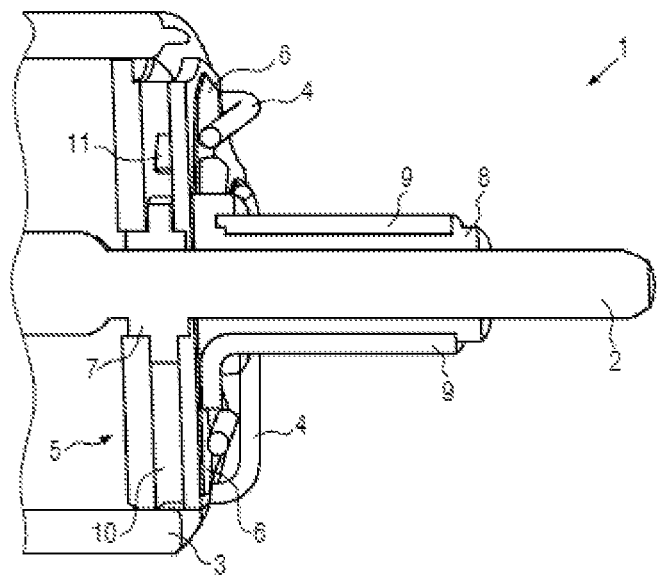
Figure 6:
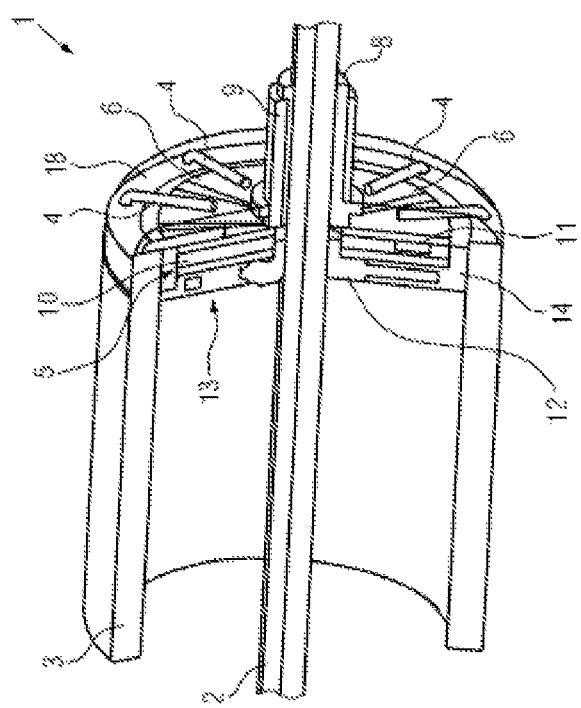
Figure 7:
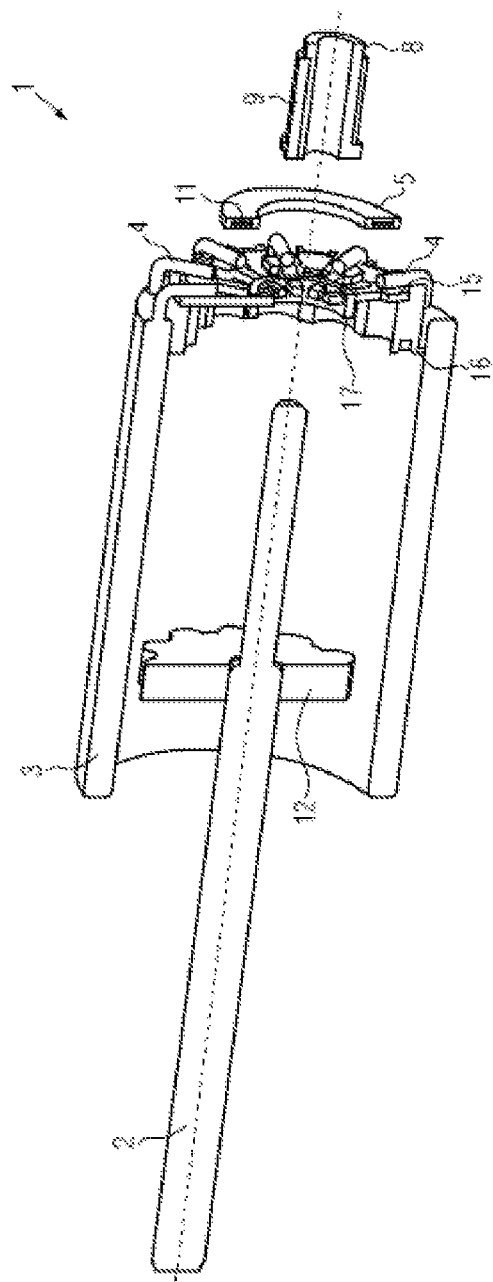
Figure 8:
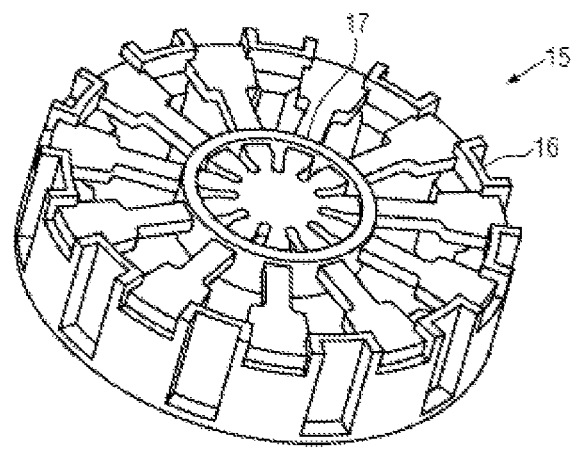
Figure 9:
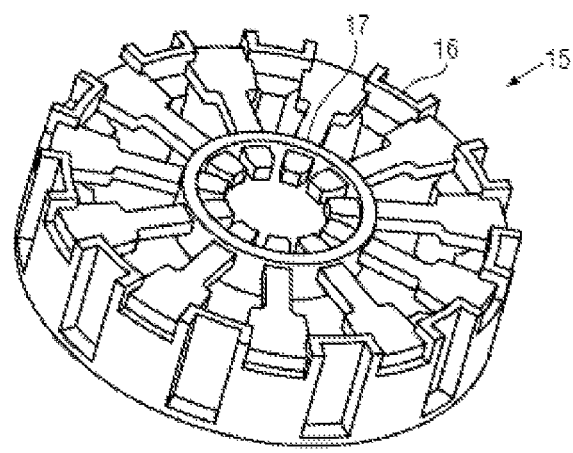

Embodiments of the present invention will be illustrated more in detail below with reference to drawings. In the drawings:

FIG. 1a shows a first embodiment of a rotor of an electric direct current motor according to the invention, FIG. 1b shows the rotor of FIG. 1a with a cover of the connecting area by a casting compound in the region of the connection between the outer rotor winding and the collector, FIG. 2 shows the printed circuit board of the rotor of FIGS. 1a and 1b in a detailed view, FIG. 3 shows the collector of the rotor of FIGS. 1a and 1b in a detailed view, FIG. 4 shows an alternative design of the collector of FIG. 3, FIG. 5 shows a further embodiment of a rotor of an electric direct current motor according to the invention, FIG. 6 shows a further embodiment of a rotor of an electric direct current motor according to the invention, FIG. 7 shows a further embodiment of a rotor of an electric direct current motor according to the invention, FIG. 8 shows the copper star of the rotor of FIG. 7 for contacting the winding terminations and the collector wires during manufacture, FIG. 9 shows the copper star of FIG. 8 in the completely processed state.

Below, equal parts are designated by equal reference numerals.

FIG. 1a shows a longitudinal section through a rotor 1 of an electric direct current motor according to the invention which is designed as a bell-shaped rotor for motors of small dimensions with metal or graphite brush commutation. The rotor 1 essentially consists of a shaft 2, an air-cored outer rotor winding 3 and a collector 8. The outer rotor winding 3 is fixed at one end to the outer periphery of a printed circuit board 5 which is in turn connected to the shaft via a metal hub 7. The printed circuit board 5 thus represents a bearing component and is made of glass-fiber reinforced epoxy resin. The outer rotor winding 3 usually wound as copper wire is held in a torque-proof manner and coaxially to the shaft 2 via the printed circuit board 5. A detailed view of the printed circuit board 5 is shown in FIG. 2, FIG. 3 shows the detailed view of the collector 8. The metal hub 7 of the printed circuit board 5 is made of steel and pressed onto the shaft 2 of the rotor 1 which also consists of steel, and it is welded to the latter. The sleeve-like collector 8 has a considerably smaller diameter than the printed circuit board 5 and comprises the collector wires 9 disposed like lamellae on its outer periphery. Each collector wire 9 is electrically connected to a winding termination 4 of the outer rotor winding 3 via a copper surface 6 of the printed circuit board 5. The copper surfaces 6 of the printed circuit board 5 are to this end arranged on the outer side of the printed circuit board 5 in a star shape and separated from each other. For assembling the rotor 1, first the shaft 2, the printed circuit board 5 and the collector 8 are selected from a plurality of alternative components corresponding to the customer's desire. The printed circuit board 5 at this time already comprises the steel hub 7 that has been pressed in and bordered. The collector 8 is already populated with the desired collector wires 9 as a separate unit. First, the printed circuit board 5 is pressed onto the shaft 2 and welded to it. In the next step, the hollow-cylindrical collector 8 is shifted over the shaft 2 down to the printed circuit board 5, so that a contact between the collector wires 9 and the copper surfaces 6 of the printed circuit board 5 exists. The collector wires 9 and the copper surfaces 6 are subsequently soldered to each other. Then, the hollow-cylindrical outer rotor winding 3 is placed onto the printed circuit board 5, where the winding terminations 4 of the outer rotor winding 3 are also soldered to the copper surfaces 6 of the printed circuit board.

FIG. 1b shows that the printed circuit board and connections are covered in a last step by a casting compound 18 which on the one hand increases stability and on the other hand prevents the occurrence of short circuits that can be caused by particles which can deposit on the winding terminations 4, the copper surfaces 6 or the collector wires 9 in the region of the printed circuit board 5.

FIG. 4 is an alternative embodiment of the collector 8 with collector wires 9 radially bent to the outside like in a star. By the collector wires 9 radially bent to the outside like in a star, the contact surface between the collector wire 9 and the copper surface 6 of the printed circuit board 5 is enlarged, thus improving the electrical contact.

FIG. 5 shows an alternative embodiment of a rotor of an electric direct current motor according to the invention. This is again a bell-shaped rotor for rotors of small dimensions with metal or graphite brush commutation. In contrast to the embodiment of FIGS. 1a and 1b, the printed circuit board 5 has a multilayer design. An inner layer 10 of the printed circuit board 5 is populated with the components for reducing sparking during commutation, and for avoiding electromagnetic radiation in the operation of the electric motor. The interference suppression circuit consists of the electric components 11 which each consist of a condenser and a resistance which are connected serially or in parallel between the copper surfaces 6 of the outer layer of the printed circuit board 5. The steel hub 7 of the printed circuit board 5 is embedded with its radially extending tongue in the multilayer design of the printed circuit board 5 during the manufacturing process of the printed circuit board 5. In this embodiment, the alternative collector 8 of FIG. 4 is employed. Here, too, the printed circuit board and connections from outside are covered with a casting compound to increase stability and exclude short circuits.

FIG. 6 shows a further embodiment of a rotor of an electric direct current motor according to the invention in a longitudinal section. This is a bell-shaped rotor of small dimensions for metal or graphite brush commutation. The rotor 1 essentially consists of a shaft 2, an outer rotor winding 3, and a collector 8. The outer rotor winding 3 is fixed with one end to the outer periphery of a metallic plate 12 and connected with the shaft 2 via the latter in a torque-proof manner and coaxially to the shaft 2. To prevent short circuits in the outer rotor winding 3, the metallic plate 12 consisting of steel is electrically insulated on either side and at the outer periphery with a plastic coating 14. To improve the bond between the metallic plate 12 and the plastic coating 14, the metallic plate 12 has axial through openings 13 in the form of bores distributed over the periphery which are also filled by the plastic coating 14. A printed circuit board 5 with an interference suppression circuit for reducing sparking during commutation is placed onto the metallic plate 12 or its plastic coating 14 from outside. The printed circuit board 5 has a multilayer design. The electric components of the interference suppression circuit are integrated on an inner layer 10 of the multilayer printed circuit board 5 by means of the so-called "embedded" technology. The printed circuit board 5 consists of a glass-fiber reinforced thermosetting plastic on which electric components 11 are applied which are each composed of a condenser and a resistance. The condenser and the resistance are each connected serially or in parallel between the copper surfaces 6 of the printed circuit board 5. The copper surfaces 6 radially distributed spaced apart on the front side of the printed circuit board 5 each serve for contacting a winding termination 4 of the outer rotor winding 3 and a corresponding collector wire 9 of the collector 8. The collector wires 9 are distributed over the periphery of the hollow-cylindrical collector 8 like lamellae. For assembling the rotor 1, the shaft 2, the metallic plate 12, the printed circuit board 5 and the collector 8 are initially chosen according to the customer's demands. The metallic plate 12 is then pressed onto the shaft 2 through the central bore of the metallic plate and welded to it. In the next step, the printed circuit board 5 and the collector 8 are placed onto the shaft, while the collector wires 9 are each soldered to one of the copper surfaces 6 of the printed circuit board 5. In the next step, the hollow-cylindrical outer rotor winding 3 of the bell-shaped rotor is placed onto the metallic plate 12. The winding terminations 4 of the outer rotor winding 3 are then also soldered each to one of the copper surfaces 6 of the printed circuit board 5. Here, too, a casting compound is applied from outside which stabilizes the mechanical connections and the printed circuit board 5, in particular the electric components 11, and protects the electrical connections against damaging and short circuits.

FIG. 7 shows a further embodiment of a rotor of an electric direct current motor according to the invention as a longitudinal section in an exploded view. Similar to the embodiment of FIG. 6, the outer rotor winding 3 is held via a metallic plate 12 in a torque-proof manner and concentrically to the shaft 2. The metallic plate 12, however, does not comprise any plastic coating. The outer rotor winding 3 is electrically insulated with respect to the metallic plate 12 by means of an external plastic ring 16. A toothing at the outer periphery of the metallic plate 12 engages an internal toothing of the outer plastic ring 16, thus ensuring a secure transmission of the torque from the outer rotor winding 3 to the metallic plate 12 and from the latter to the shaft 2. The metallic plate 12 is pressed with its central bore onto the shaft 2 and welded to it. The outer plastic ring 16 is injected into a copper star 15 which is illustrated more in detail in FIGS. 8 and 9. For its manufacture, the copper star 15 is punched out of sheet copper where the beams of the copper star 15 facing outwards initially remain connected in the center. Then, the outer plastic ring 16 and the inner plastic ring 17 are applied onto the copper star 15 whereby the beams of the copper star 15 are then held in position. This state of the copper star 15 is illustrated in FIG. 8. Since the beams of the copper star 15 are fixed in their positions by the two plastic rings 16 and 17, now the central region of the star which connects the beams with each other can be punched out. This state is illustrated in FIG. 9. The beams now no longer touch each other and are thus not connected to each other in an electrically conductive manner. For assembling the rotor 1, the outer rotor winding 3 is placed onto the copper star 15, while the winding terminations 4 of the outer rotor winding 3 are each electrically contacted by one beam of the copper star 15. When the copper star 15 and the outer rotor winding 3 are inserted with the steel plate 12 already mounted on the shaft 2, the inner plastic ring 17 of the copper star 15 takes care that the beams of the copper star 15 are spaced apart from the metallic plate 12 and are thus not short-circuited by the metallic plate 12. In the completely mounted rotor 1, the collector wires 9 of the hollow-cylindrical collector 8 are also each connected with one beam of the copper star 15. For the suppression of sparks, a printed circuit board 5 with the electric components 11 of an interference suppression circuit can be placed onto the copper star 15.

The invention claimed is:

1. An electric direct current motor comprising:
   a shaft;
   a winding support;
   a multilayer printed circuit board;
   a collector with several collector wires; and
   an air-cored outer rotor winding with several winding terminations, wherein the outer rotor winding is connected at one end to the shaft via the winding support in a torque-proof manner, and the outer rotor winding is electrically connected to the collector, and wherein the printed circuit board is a winding bearing component of glass-fiber reinforced thermosetting plastics is connected with the shaft via a metal hub,
   wherein the metal hub is positively embedded with at least one radial groove and/or radial tongue in the multilayer printed circuit board.

2. The electric direct current motor according to claim 1, wherein the printed circuit board comprises;
   on an axial outer side opposed to the outer rotor winding, several separate copper surfaces distributed in a circumferential direction for contacting one winding termination and one corresponding collector wire each.

3. The electric direct current motor according to claim 1, comprising:
   an interference suppression circuit, for reducing sparking during commutation, which is integrated in the printed circuit board.

4. The electric direct current motor according to claim 3, wherein the multilayer printed circuit board is arranged in an axial direction of the shaft.

5. The electric direct current motor according to claim 4, wherein electric components of the interference suppression circuit are integrated on an inner layer of the multilayer printed circuit board.

6. The electric direct current motor according to claim 1, wherein the metal hub is pressed into the printed circuit board and bordered or radially riveted with the multilayer printed circuit board.

7. The electric direct current motor according to claim 1, wherein the metal hub is connected to the shaft by frictional and material bonding connections.

8. A method for manufacturing an electric direct current motor having a shaft; a winding support; a multilayer printed circuit board; a collector with several collector wires; and an air-cored outer rotor winding with several winding terminations, wherein the outer rotor winding is connected at one end to the shaft via the winding support in a torque-proof manner, and the outer rotor winding is electrically connected to the collector, and wherein the multilayer printed circuit board is a winding bearing component of glass-fiber reinforced thermosetting plastics and is connected with the shaft via a metal hub, wherein the metal hub is positively embedded with at least one radial groove and/or radial tongue in the multilayer printed circuit board, and wherein for assembling the rotor, the method comprises:
   pressing first the multilayer printed circuit board with the metal hub onto the shaft;
   subsequently welding the metal hub and the shaft to each other;
   placing the collector with the collector wires as a separate unit onto the shaft;
   electrically connecting the collector wires to a pertaining winding termination via respective suited contact surfaces after the outer rotor winding has been placed; and
   subsequently casting electrical and mechanical connection points with a casting compound.

9. The method according to claim 8, comprising:
   welding the metal hub and the shaft to each other by laser welding.

* * * * *